(12) United States Patent
Price et al.

(10) Patent No.: US 12,391,446 B2
(45) Date of Patent: Aug. 19, 2025

(54) PIPE FRAME

(71) Applicant: EARTHECO GLOBAL PTY LTD, Brendale (AU)

(72) Inventors: Wade Price, Brendale (AU); William Simmons, Brendale (AU); Dermot Lindsay, Brendale (AU)

(73) Assignee: EARTHECO GLOBAL PTY LTD, Brendale (AU)

( * ) Notice: Subject to any disclaimer, the term of this patent is extended or adjusted under 35 U.S.C. 154(b) by 117 days.

(21) Appl. No.: 18/256,520

(22) PCT Filed: Dec. 6, 2021

(86) PCT No.: PCT/AU2021/051456
§ 371 (c)(1),
(2) Date: Jun. 8, 2023

(87) PCT Pub. No.: WO2022/120415
PCT Pub. Date: Jun. 16, 2022

(65) Prior Publication Data
US 2024/0092548 A1 Mar. 21, 2024

(30) Foreign Application Priority Data
Dec. 8, 2020 (AU) ................................ 2020904548

(51) Int. Cl.
*B65D 71/00* (2006.01)
*B65D 61/00* (2006.01)
(Continued)

(52) U.S. Cl.
CPC ......... *B65D 71/0088* (2013.01); *B65D 61/00* (2013.01); *B65D 85/20* (2013.01); *F16L 3/23* (2013.01)

(58) Field of Classification Search
CPC .... B65D 71/0088; B65D 61/00; B65D 85/20; F16L 3/23
See application file for complete search history.

(56) References Cited

U.S. PATENT DOCUMENTS 1,082,848 A * 12/1913 Dargin ............... B65D 63/1018
16/235
4,099,626 A * 7/1978 Magnussen, Jr. ...... A47B 63/02
248/68.1

(Continued)

FOREIGN PATENT DOCUMENTS

| AU | 2019204624 A1 * | 1/2020 | |
| WO | WO-2012155191 A1 * | 11/2012 | ............. B65B 27/10 |
| WO | WO-2015066575 A1 * | 5/2015 | ......... B65D 21/0212 |

OTHER PUBLICATIONS

XF-Vel plastic bright green colored tamper proof tag tie sold on amazon dated Jan. 11, 2020, https://www.amazon.com/Plastic-Numbered-Security-Disposable-Self-Locking/dp/B08GHNXJZ9?th=1 (Year: 2020).*

(Continued)

*Primary Examiner* — Terrell L McKinnon
*Assistant Examiner* — Ding Y Tan
(74) *Attorney, Agent, or Firm* — Schwabe, Williamson & Wyatt, P.C.

(57) ABSTRACT

A pipe frame, a pipe crate and methods of use thereof for holding a plurality of pipes together for storing, handling and transport are disclosed herein. In one form, there is provided a pipe frame including: at least two frame members connectable together to form the pipe frame; at least one transverse leg formation operatively associated with an end of a first frame member; at least one receiving opening defined at an end of a second frame member and configured to at least partially receive the at least one transverse leg formation for attachment and orientation of the first frame (Continued)

member relative to the second frame member; a locking catch operatively associated with the receiving opening; and a locking element operatively associated with the transverse leg formation and releasably connectable to the locking catch for locking the first frame relative to the second frame.

18 Claims, 13 Drawing Sheets

(51) Int. Cl.
  *B65D 85/20* (2006.01)
  *F16L 3/23* (2006.01)

(56) References Cited

U.S. PATENT DOCUMENTS

| | | | | |
|---|---|---|---|---|
| 4,378,923 A | * | 4/1983 | Takei | B65D 61/00 206/443 |
| 5,058,746 A | * | 10/1991 | Morgan, IV | B65D 19/18 220/4.32 |
| 5,860,627 A | * | 1/1999 | Edwards | E04G 5/004 206/443 |
| 6,474,613 B2 | * | 11/2002 | O'Malley | B65D 71/70 248/346.02 |
| 7,080,864 B2 | * | 7/2006 | Casteran | B66C 1/16 294/67.4 |
| 2003/0205907 A1 | | 11/2003 | Casteran | |
| 2018/0162614 A1 | * | 6/2018 | Lu | B65D 61/02 |
| 2019/0322444 A1 | * | 10/2019 | Kim | B65D 85/20 |

OTHER PUBLICATIONS

International Search Report and Written Opinion for PCT/AU2021/051456, dated Feb. 1, 2022, 10 pages.

* cited by examiner

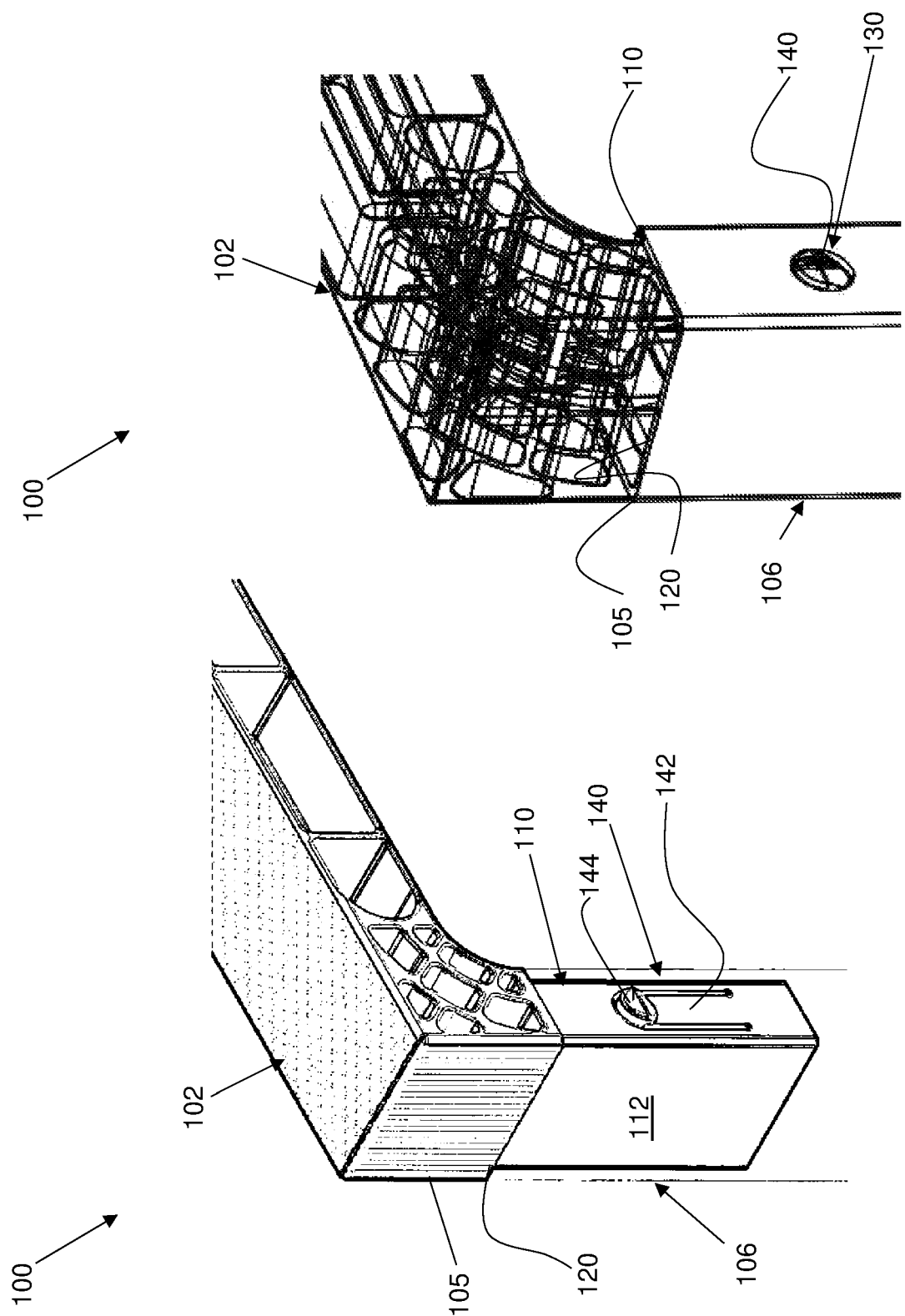

PIPE FRAME

CROSS-REFERENCE TO RELATED APPLICATION

The present application is a national phase entry under 35 U.S.C. § 371 of International Application No. PCT/AU2021/051456, filed Dec. 6, 2021, which designates the United States of America, which claims priority to AU application No. 2020904548, filed Dec. 8, 2020, the entire disclosures of each of these applications are hereby incorporated by reference in their entireties and for all purposes.

TECHNICAL FIELD

The present invention relates to a pipe frame, a pipe crate and methods of use thereof for holding a plurality of pipes together for storing, handling and transport.

BACKGROUND

Pipes, such as, e.g., tubular rigid sections of polymeric pipe, are usually manufactured by an extrusion process and bundled or packaged together as they come off a factory line to enable them to be stored efficiently.

When transporting the pipes to a remote site, such as, e.g., building sites and/or sites for distribution and sale, it is common practice to bundle the pipes into a pipe frame or pipe crate. Such pipe frames or crates are usually configured to contain anywhere between three and 90 pipes and enable the bundles of pipes to be stored and handled more efficiently as a single entity on a smaller footprint than if the pipes were individually handled or laid out on a surface.

Typically, such pipe frames or crates comprise a rectangular wooden frame formed from four wooden slats or frame members nailed together to extend circumferentially around a bundle of pipes. The slats or frame members are usually nailed to each other in an end to end arrangement and therefore the strength of the join is not assured. As such, it is common practice to further bolster the pipe frame or crate with plastic strapping or wrapping circumferentially extending around the wooden frame.

Other than the lack of strength and the additional need for plastic strapping or wrapping, other problems in general with such conventional pipe frames and crates include that the wooden slats or frame members have no engineering properties and are generally discarded after a single use.

Accordingly, conventional pipe frames or crates are usually crudely formed and prone to failure. Indeed, the applicant is aware of several instances where one or more pipe frames or crates have broken whilst in transit on trucks. In such scenarios, the pipes are ordinarily only held together by one or more load restraining straps, which are only intended for lashing an assembled load on a trailer of the truck and are certainly not intended to hold a bundle of pipes together. Such failures could readily result in a bundle of pipes being dropped on a road during transit, which could result in damage to other vehicles on the road and possibly injury or death to the drivers of these vehicles.

Earlier packaging and lifting assemblies have been developed for the transport of elongate items, such as, e.g., pipes.

For example, US Patent Publication No. 2019/0322444 A1 discloses a packaging system for elongated products comprising a four moulded frame members configured to be connectable to form a frame extending circumferentially around the elongated products. However, the frame is complicated to assemble and additionally requires plastic strapping or wrapping to extend around the frame and lock the frame members together.

International Patent Publication No. WO 2012/155191 A1 discloses another packaging system for the transportation of elongated product comprising a lower horizontal frame member and an opposed upper horizontal frame member configured to interconnect with opposed side frame member to form a frame extending circumferentially around the elongated products. However, the frame is not suitable for packaging cylindrically shaped elongated products, such as, e.g., bundles of pipes, and the connectors connecting the respective horizontal and vertical frame members are overly complicated and weak and thus would likely be prone to failure if used with pipes in transit.

US Patent Publication No. 2003/0205907 A1 discloses a lifting system for lifting elongated products. The system includes a plurality of horizontal frame members configured to extend parallel to one another between and interconnect with a pair of opposed side frame members. However, the frame is adapted to individually package elongated products, such as, e.g., pipes, in an orderly array and thus would not be suitable for packaging a bundle of pipes. Further, the connections between the horizontal frame members and the opposed side frame member are over engineered and would be time consuming to assemble and require additional tooling.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide a pipe frame, a pipe crate and methods of use thereof, which may at least partially address one or more of the problems or deficiencies mentioned above or which may provide the public with a useful or commercial choice.

According to a first aspect of the present invention, there is provided a pipe frame for holding a plurality of pipes together, said pipe frame including:

at least two frame members, including a first frame member and a second frame member, connectable together to form the pipe frame, each frame member including a pair of opposed ends; and at least a pair of locking arrangements for releasable securing the frame members together at adjacent ends to permit the first frame member to be selectively locked and unlocked relative to the second frame member so that the first frame member can be selectively detached and re-attached relative to the second frame member, each locking arrangement including:

a transverse leg formation operatively associated with an end of the first frame member;

a receiving opening defined at an end of the second frame member and configured to at least partially receive the transverse leg formation for attachment and orientation of the first frame member relative to the second frame member;

a locking catch operatively associated with the receiving opening; and a locking element operatively associated with the transverse leg formation and releasably connectable to the locking catch when the transverse leg formation is received in the receiving opening for securing, or locking, the first frame member relative to the second frame member.

According to a second aspect of the present invention, there is provided a pipe frame for holding a plurality of pipes together, said pipe frame including:
- at least two frame members, including a first frame member and a second frame member, connectable together to form the pipe frame, each frame member including a pair of opposed ends;
- at least one transverse leg formation operatively associated with an end of the first frame member;
- at least one receiving opening defined at an end of the second frame member and configured to at least partially receive the at least one transverse leg formation for attachment and orientation of the first frame member relative to the second frame member;
- a locking catch operatively associated with the receiving opening; and
- a locking element operatively associated with the transverse leg formation and releasably connectable to the locking catch when the transverse leg formation is received in the receiving opening for securing, or locking, the first frame relative to the second frame.

According to a third aspect of the present invention, there is provided a pipe frame for holding a plurality of pipes together, said pipe frame including:
- an upper frame member and an opposed lower frame member each extending in a generally horizontal orientation and a pair of opposed side frame members extending between the upper frame member and the lower frame member to form the pipe frame, each frame member including a pair of opposed ends;
- at least one transverse leg formation operatively associated with each end of the upper frame member and the lower frame member;
- at least one receiving opening defined at each end of the opposed side frame members, each said at least one receiving opening configured to at least partially receive a respective said at least one transverse leg formation for attachment and orientation of the upper and lower frame members relative to the side frame members;
- a locking catch operatively associated with each said receiving opening; and
- a locking element operatively associated with each said transverse leg formation and releasably connectable to a corresponding said locking catch when the transverse leg formation is received in the receiving opening for securing, or locking, the upper and lower frame members relative to the opposed side frame members.

Advantageously, the pipe frame of the present invention provides a safe, reliable and reusable means for holding a plurality of pipes together not only in storage but also during transit. The transverse leg formations provide a light-weight yet strong corner connection between adjacent frame members that maintains a rectilinear orientation of the respective frame members for ease in assembly. Further, the transverse leg formation provides a much stronger and structurally superior join between adjacent frame members than a conventional corner join. Moreover, the locking element, apart from engaging with the locking catch to secure the frame members together, also provides both audible and visual feedback to an operator as it biases into engagement with the locking catch thereby reducing assembly time and assuring safety once assembled.

As indicated, the pipe frame is configured to circumferentially extend around a bundle of pipes to keep the pipes together and assist in storage, handling and transport of the bundle of pipes, particularly road transport on trailer of a truck.

The pipe frame may be of any suitable size, shape and construction and may be formed from any suitable material or materials. Generally, the pipe frame may be formed from metal and/or plastic material or materials, preferably the latter, more preferably a settable polymeric material.

The pipe frame may be rectangular, circular, triangular, pentagonal or any variation or combination thereof, preferably rectangular.

Typically, the pipe frame may be formed from two or more frame members joined together.

For example, in some embodiments, the pipe frame may include two frame members, including a substantially U-shaped frame member corresponding to the second frame member and an upper frame member or first frame member extending between the ends of the U-shaped frame member.

In other embodiments, the pipe frame may include two L-shaped frame members configured to be joined end-to-end to form the pipe frame. In such embodiments, one L-shaped frame member may correspond to the first frame member and the other may correspond to the second frame member.

In preferred embodiments, the pipe frame may include four frame members including an upper frame member, an opposed lower frame member and opposed side frame members extending therebetween. The upper and lower frame members may extend in a generally horizontal orientation, preferably substantially parallel to one another. The side frame members may orthogonally extend between the ends of the upper and lower frame members to form the pipe frame. In such embodiments, the upper and lower frame members may generally correspond to the first frame member and the side frame members may each correspond to the second frame member.

The frame members may be of tubular or solid construction, preferably the former. Each frame member may have a substantially circular, oval or rectangular cross-section, preferably rectangular.

Each frame member may include a pair of opposed ends and an elongate body having at least one sidewall extending therebetween, preferably in a linear direction. The elongate body may preferably be defined by four sidewalls, including an inner wall, an opposed outer wall and opposed side walls.

The frame members may be constructed in any suitable way. For example, the frame members may be machine folded, extruded or moulded.

In preferred embodiments, the frame members may be formed by extrusion and/or injection moulding, preferably from a polymeric material, such as, e.g., polyethylene or polypropylene. For example, the upper and lower frame members may be formed by injection moulding and the side frame members may be extrusions.

Each frame member may be of a tubular construction. In some embodiments, the frame members may include one or more internal walls and/or ribs to provide suitable mechanical strength while keeping the frame member light so that it can be readily handled and carried by an operator without special equipment, such as, e.g., hoists and cranes.

The various frame members may be of any suitable length, may have a width of about 30-80 mm, a height of about 30-50 mm.

The frame members may have a wall thickness that varies. For example, the wall thickness may range from 3-20 mm, preferably 8-15 mm.

As indicated, the pipe frame further includes at least one locking arrangement for joining the various frame members together in an end-to-end arrangement to form the pipe frame.

The at least one locking arrangement may be of any suitable size, shape and construction to permit the ends of frame members of the pipe frame to be detached and re-attached relative to other frame members.

Generally, one locking arrangement may permit a pair of frame members to be releasably joined together. Accordingly, a pair of locking arrangements provided on adjacent ends may be provided for joining at least two frame members together to form the pipe frame. Conversely, four locking arrangements provided on adjacent ends may be provided for joining four frame members together to form the pipe frame.

In some embodiments, the at least one locking arrangement may permit a selected frame member to be manually detached from the other frame members by a quick release mechanism. Preferably, the quick release mechanism may enable the detaching of the first frame member at a first end relative to a second frame member for detachment therefrom.

Typically, the at least one locking arrangement may include complementary engagement formations associated with the ends of the respective first and second frame members configured to engage with each other for attaching the first frame member relative to the second frame member.

The complementary engagement formations may be integrally formed with the ends of the frame members or may be of separate construction joined to the ends of the frame members, preferably integrally formed.

The complementary engagement formations may include a first formation associated with an end of the first frame member and a second formation connectable to the first formation and associated with an end of the second frame member for attaching the frame members together in an end-to-end arrangement.

In preferred embodiments, the complementary engagement formations may include at least one transverse leg formation and a corresponding at least one receiving opening for at least partially receiving the transverse leg formation for joining the frame members together.

The at least one transverse leg formation may be provided on at least one end of the first frame member, preferably both ends. In preferred embodiments, the at least one transverse leg formation may be provided on each of the opposed ends of the upper and lower frame members.

The transverse leg formation may include a leg formation projecting transversely away from the end of the frame member, preferably in an orthogonal orientation relative to a longitudinal axis of the frame member. Suitably, the transverse leg formations may protrude away in the same direction at each end of the frame member, so as to enable the frame member to join other frame members and form the pipe frame.

The leg formation may be of any suitable length to securely join the frame members together. For example, the leg formation may have a length, as defined between an inner wall of the frame member and a distal tip of the leg, of about 100 mm, about 110 mm, about 120 mm, about 130 mm, about 140 mm, about 150 mm, about 160 mm, about 170 mm, about 180 mm, about 190 mm, about 200 mm, about 210 mm, about 220 mm, about 230 mm, about 240 mm, about 250 mm, about 260 mm, about 270 mm, about 280 mm, about 290 mm, about 300 mm, about 310 mm, about 320 mm, about 330 mm, about 340 mm, about 350 mm, about 360 mm, about 370 mm, about 380 mm, about 390 mm, about 400 mm, about 410 mm, about 420 mm, about 430 mm, about 440 mm, about 450 mm, about 460 mm, about 470 mm, about 480 mm, about 490 mm or even about 500 mm or more.

The at least one transverse leg formation may include one or more fillet and curve elements to maintain a high strength to weight ratio. The one or more fillets and curves may be defined on the opposed sidewalls of the leg formation. Advantageously, the one or more fillet and curve elements may reduce peak load stress and maximise corner strength while maintaining minimum mass.

Preferably, each of the opposed ends of the first frame member, or the upper and lower frame members, may curve to some extent to provide a smooth transition into, and at least partially define the transverse leg formation at each end.

The receiving opening may be defined in, or formed by, an open end of the second frame member, preferably the opposed side frame members. The receiving opening may be suitable sized and shaped to snugly receive the leg formation.

In some embodiments, the four sidewalls of the second frame member, or opposed side frame members, may define the receiving opening at each end.

In other embodiments, the receiving opening may be defined in an insert configured to be received in each end of the second frame member, or the opposed side frame members.

Advantageously, the engagement of each leg formation with a corresponding receiving opening orientates the first frame member, or the upper and lower frame members, for attachment to the opposed side frame members for forming the pipe frame. This simplifies and speeds up assembly of the pipe frame, particularly when compared to conventional pipe frames that include complicated connectors often requiring additional tooling.

Further, by being snugly received in the receiving openings, the transverse leg formations advantageously provide some rigidity to a partially assembled pipe frame ensuring, e.g., that opposed side frames automatically orthogonally extend relative to a lower frame member without any external input for achieving a rectilinear orientation for attachment of the upper frame member relative thereto.

In some embodiments, the at least one locking arrangement may be configured to automatically secure, or lock, the first frame member relative to the second frame member when the transverse formation associated with an end of the first frame member is at least partially received in the receiving opening associated with an adjacent end of the second frame member.

As indicated, the locking arrangement further includes a locking catch operatively associated with the receiving opening and a locking element operatively associated with the transverse leg formation and configured to be releasably connectable to the locking catch when the transverse leg formation is received in the receiving opening.

In use, engagement of the locking catch with the locking element may advantageously prevent the transverse leg formation from being axially removed from the receiving opening thereby securing, or locking, the first frame member, or the upper or lower frame member, relative to the second frame member, or the opposed side frame members.

Each of the locking catch and the locking element may be of any suitable size, shape and construction to be engagement with one another to releasably secure the transverse leg formation to the receiving opening.

For example, in some embodiments, the locking catch may include a female formation configured to at least partially receive, or mate with, a male formation of the locking element. The mateable male and female formations may couple together in any suitable way, such as, e.g., an interference (snap-fit) connection or a friction fit connection.

In other embodiments, the locking catch may include a protrusion or depression defined in an outer sidewall adjacent the receiving opening and the locking element may include a locking tongue associated with the at least one transverse leg formation and sized and shaped to engage with the protrusion or depression when the at least one transverse leg formation is inserted into the receiving opening.

In preferred embodiments, the locking catch includes a locking aperture defined a sidewall of the second frame member, or the opposed side frame members, at or near the receiving opening, and the locking element is configured to project through the locking aperture when the transverse leg formation is inserted into the receiving opening, preferably biased to displace outwardly into the locking aperture.

The locking element may be of any suitable size, shape and construction.

For example, in some embodiments, the locking element may be spring-loaded, or -mounted, on the transverse leg formation and configured to spring outwardly from the transverse leg formation when it is in register with the locking aperture.

In other embodiments, the locking element may be integrally formed with the transverse leg formation and may include a resilient finger configured to be biased away from the transverse leg formation and into engagement with the locking aperture when the transverse leg formation is inserted into the receiving opening to thereby automatically secure the first frame, or upper or lower frame member, relative to the second frame member, or the opposed side frame members, when the transverse leg formation is inserted into the receiving opening.

In some embodiments, the resilient finger of the locking element may further include a locking tab on a distal end thereof configured to be received within the locking aperture, preferably to displace outwardly into the locking aperture, more preferably to protrude through the locking aperture and out past the outer sidewall of the frame member.

In some such embodiments, the locking tab may include a visual indicator so as to readily indicate when the first frame member, or upper or lower frame members, are secured, or locked, relative to the second frame member, or the opposed side frame members. The visual indicator may include a bright colour or combination of colours that is readily visible, such as, e.g., a fluorescent orange, yellow or green colour.

Advantageously, in such embodiments, the visual indicator may provide quick visible feedback to an operator assembling the pipe frame and/or to a driver before transporting a bundle of pipes, that the pipe frame components are secured relative to each other.

In other such embodiments, the locking tab may also provide an audible indicator as the at least one locking tab clicks into engagement with the locking aperture so as to readily indicate when the first frame member, or the upper or lower frame members, are secured, or locked, relative to the second frame member, or the opposed side frame members.

In use, the locking element may be disengaged from the locking catch by depressing the resilient finger of the locking element against its bias out of engagement with the locking catch, preferably locking aperture. In preferred embodiments, the protruding locking tab may be depressed out of engagement with the locking aperture against the bias of the resilient finger such that the transverse leg formation may then be axially removed from the receiving opening to thereby detach an end of the first frame member, or upper or lower frame member, relative to the second frame member, or opposed side frame member.

Advantageously, the locking catch and elements secure the frame member relative to each other to provide a sturdy pipe frame yet also enable the frame members to be manually detached from each other quickly and easily and without additional tools.

In some embodiments, at least one of the frame members forming the pipe frame may have an outer surface of a wall that has been modified to increase its coefficient of friction, preferably an outer surface of an outer wall of an upper and/or lower frame member.

The surface may be modified in any suitable way to increase its coefficient of friction. For example, the surface may have scales, ribbing, grooves or knurling defined thereon.

In some embodiments, the surface may have a plurality of grooves or ribbing defined thereon. The grooves or ribbing may extend transversely or longitudinally relative to a length of the frame member.

In such embodiments, the coefficient of friction may be increased to at least 0.5, preferably from about 0.55 to about 0.58. By way of comparison, conventional pipe frames made from wooden slats or frame members have a coefficient of friction of about 0.4.

Advantageously, by increasing the coefficient of friction via the plurality of grooves defined on the outer surface of the outer wall of the upper and lower frame members, the grip of the pipe frame on trailer load deck and/or with other like pipe frames arranged in a stacked arrangement may be increased and thereby provide a stabler load during transport.

In some embodiments, an inner wall of at least one of the frame members may include a plurality of grooves defined thereon and extending in a transverse orientation relative to a longitudinal axis of the frame member, preferably an inner wall of at least one of the upper and lower frame members.

Each groove may be configured to at least partially receive at least part of one of the plurality of pipes.

Advantageously, the plurality of grooves defined on the inner walls of the frame members may stabilise and/or secure the pipe frame relative to the plurality of pipes encompassed thereby to again provide a stabler load during transport.

According to a fourth aspect of the present invention, there is provided a pipe crate including:
  a group of closely packed pipes; and
  at least two pipe frames according to any one of the first, second and third aspects extending circumferentially around the group of closely packed pipes to hold the pipes together, said pipe frames being spaced from each other along a length of the pipes so to form a single entity together with the pipes.

The at least two pipe frames may be located at any suitable location along a length of the group of pipes.

For example, in some embodiments the at least two pipe frames may be respectively located at or near the opposed ends of the group of pipes.

In some embodiments, the pipe crate may further include one or more intermediate pipe frames relative to the at least two pipe frames. For example, the pipe crate may further include a third pipe frame located in between the at least two pipe frames, preferably mid-way along a length of the group of popes.

According to a fifth aspect of the present invention, there is provided a method of bundling a plurality of pipes together, said method including:
  placing at least one lower frame member having a pair of attached side frame members on a support surface so as to form an upwardly facing cradle;
  loading pipes in the cradle; and
  releasably securing an upper frame member relative to each side frame member with a pair of locking arrangement so as to form a pipe frame, each said locking arrangement configured to permit the upper frame member to be locked and unlocked relative to the cradle so that the upper frame member can be selectively detached and re-attached therefrom.

The method may include one or more characteristics or features of the pipe frame and pipe crate as hereinbefore described.

Any of the features described herein can be combined in any combination with any one or more of the other features described herein within the scope of the invention.

The reference to any prior art in this specification is not and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows:

FIGS. 4 and 5 are upper perspective views showing further detail of an upper corner of the pipe frame as shown in FIG. 3;

DETAILED DESCRIPTION

FIGS. 1 to 14 show pipe frames (100), pipe crates (200) and parts and uses thereof according to embodiments of the present invention.

Figure 1:
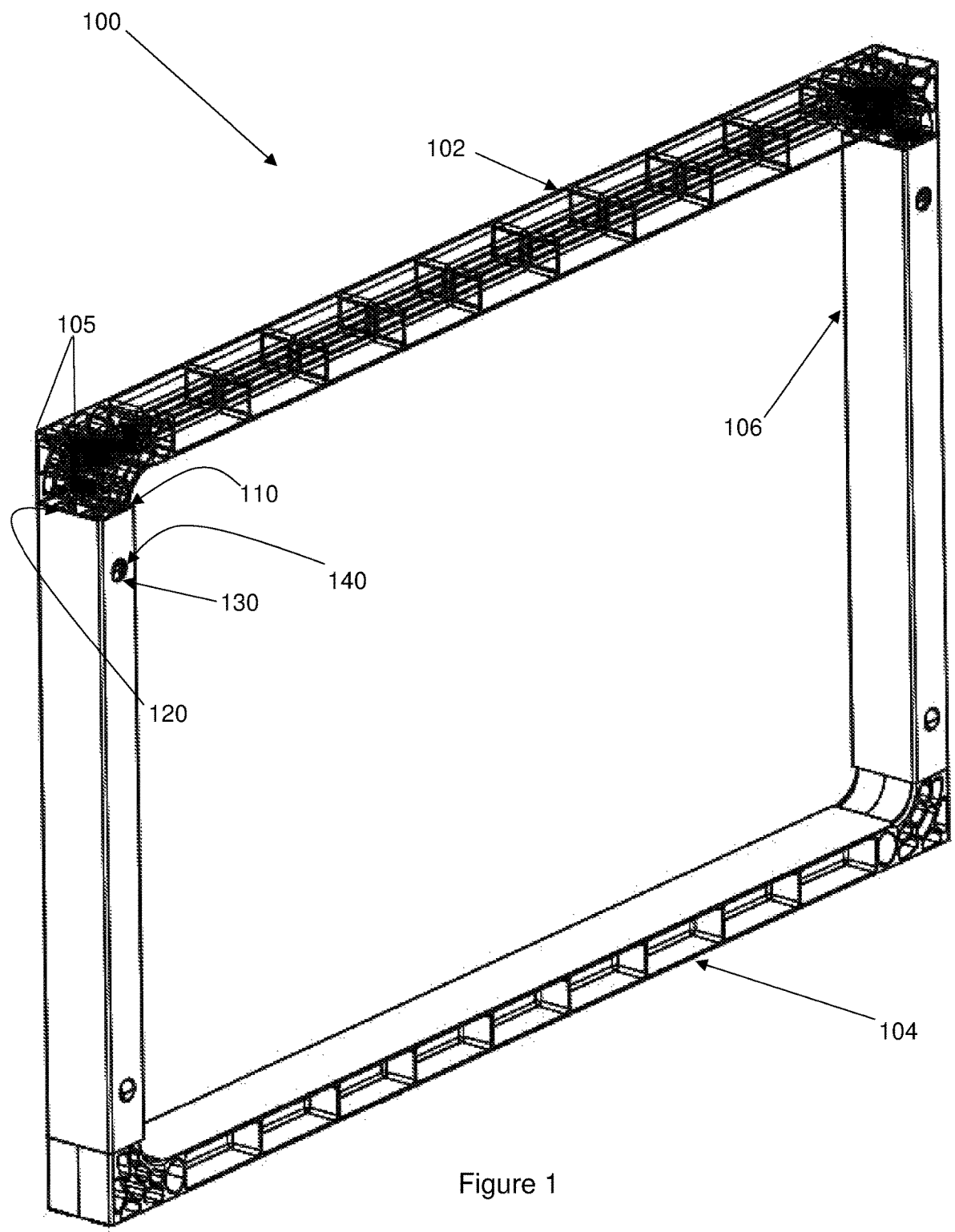
FIG. 1 is an upper perspective view of a pipe frame according to an embodiment of the present invention.

Referring to FIG. 1, the pipe frame (100) includes an upper frame member (102), an opposed lower frame member (104) and a pair of opposed side frame members (106) extending between the opposed ends (105) of the upper frame member (102) and the lower frame member (104) to form the pipe frame (100).

Each end (105) of the upper and lower frame members (102, 104) includes a transverse leg formation (110).

Each end (105) of the opposed side frame members (106) defines a receiving opening (120) configured to at least partially receive a respective transverse leg formation (110) for attachment and orientation of the upper and lower frame members (102, 104) relative to the side frame members (106).

Each receiving opening (120) further includes a locking aperture (130; i.e., locking catch) and each transverse leg formation (110) further includes a locking element (140) configured to be releasably connectable to a locking aperture (130) when a transverse leg formation (110) is received in a receiving opening (120) for securing, or locking, an upper or lower frame member (102, 104) relative to a connected side frame member (106).

As shown, the pipe frame (100) has a generally rectangular shape with the frame being elongated along the longitudinal axes of the upper and lower frame members (102, 104).

The frame members (102, 104, 106) are formed from a settable polymeric material. The upper and lower frame members (102, 104) are integrally formed with the transverse leg formations (110) by injection moulding. The opposed side frame members (106) are extrusions.

Each frame member (102, 104, 106) is of a tubular construction having a rectangular cross section. As shown, the upper and lower frame members (102, 104) include one or more internal walls and ribs to provide suitable mechanical strength while keeping the frame member light so that it can be readily handled and carried by an operator without special equipment, such as, e.g., hoists and cranes.

Each frame member (102, 104, 106) includes a pair of opposed ends (105) and an elongate body extending therebetween in a generally linear direction. The elongate body is defined by four walls, including an inner wall, an opposed outer wall and opposed sidewalls.

Referring to FIG. 4, the transverse leg formation (110) is formed on each end of the upper end lower frame members (102, 104 (not shown)).

The transverse leg formation (110) include a leg formation (112) projecting transversely away from the end (105) of the frame member (102) in an orthogonal orientation relative to a longitudinal axis of the frame member (102). The transverse leg formation (110) projects away in a same direction at each end (105) of the frame member (102) so to enable to the frame member (102) to join with side frame members (106) for forming the pipe frame (100).

Figure 2:
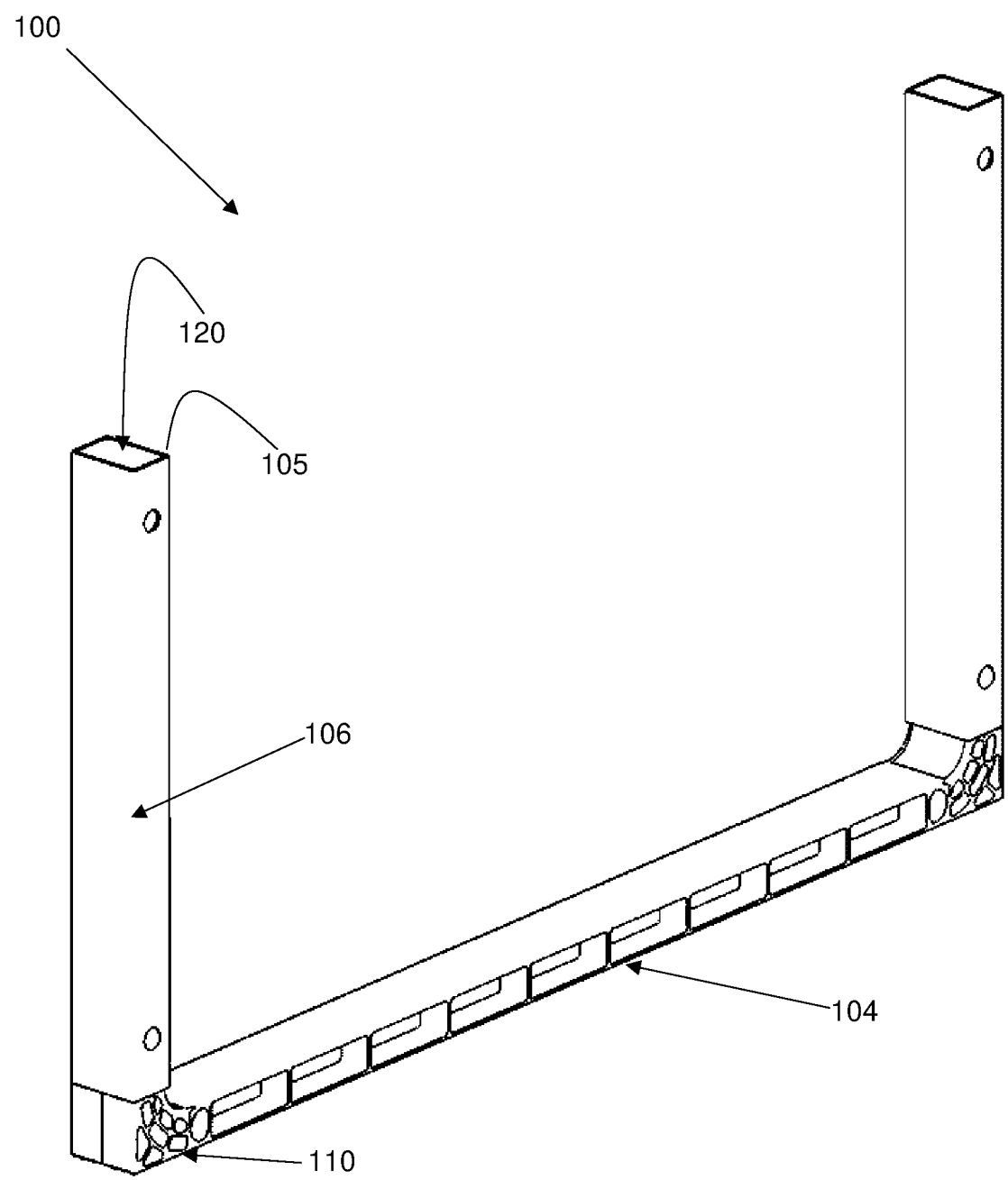
FIG. 2 is an upper perspective view of the pipe frame of FIG. 1 with an upper frame member removed.
Figure 3:
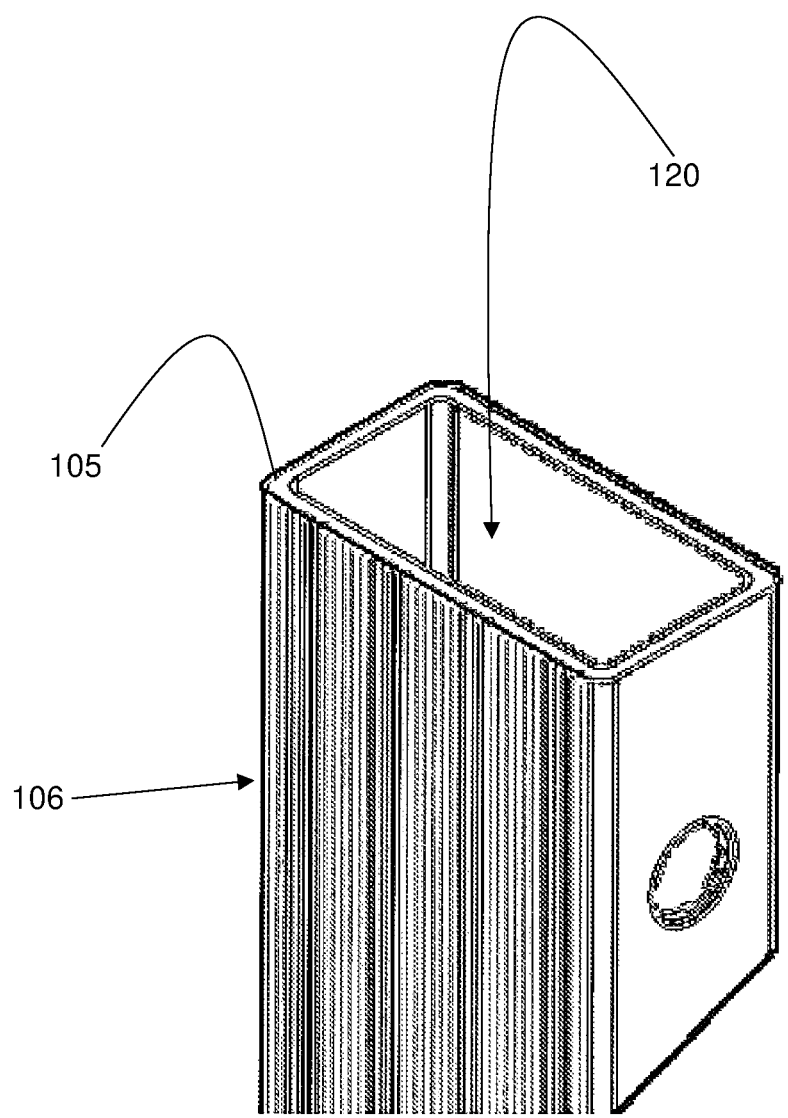
FIG. 3 is an upper perspective view of an upper portion of a side frame member of the pipe frame as shown in FIGS. 1 and 2.

Referring briefly to FIGS. 2 and 3 in particular, the receiving opening (120) defined in each end (105) of the opposed side frame members (106) is defined by the open ends (105) of the frame members (106) and configured to each snugly receive a transverse leg formation (110; shown only in FIG. 2) therein.

Referring to FIG. 2, engagement of each leg formation (110) with a corresponding receiving opening (120) orientates the upper and lower frame members (102 (not shown), 104), for attachment to the opposed side frame members (106) for forming the pipe frame (100). This simplifies and speeds up assembly of the pipe frame (100), particularly when compared to conventional pipe frames that include complicated connectors often requiring additional tooling.

Further, by being snugly received in the receiving openings (120), the transverse leg formations (110) advantageously provide rigidity to a partially assembled pipe frame (100), as shown, ensuring, e.g., that the opposed side frames (106) automatically orthogonally extend relative to a lower frame member (104) without any external input for achieving a rectilinear orientation for attachment of the upper frame member (102; not shown) relative thereto.

Referring to FIGS. 4 and 5, and as indicated, each transverse leg formation (110) further includes a locking element (140) for engaging with a corresponding locking aperture (130; shown only in FIG. 5) when the transverse leg formation (110) is inserted into a corresponding receiving opening (120) for securing, or locking, the transverse leg formation (110) and thus the upper or lower frame member (102, 104 (not shown)) relative to the receiving opening (120) of the side frame member (106).

Referring to FIG. 5, the locking aperture (130) is defined in a sidewall of each side frame member (106) near the end (105) and has a substantially circular shape.

Referring to FIG. 4, the locking element (140) is integrally formed with the transverse leg formation (110) and includes a resilient finger (142) configured to bias outwards away from the transverse leg formation (110) and into engagement with a corresponding locking aperture (130; shown in FIG. 5) when the transverse leg formation (110) is inserted into the receiving opening (120) to thereby automatically secure the upper or lower frame member (102, 104 (not shown)) relative to the side frame member (106).

As shown, the resilient finger (142) further includes a locking tab (144) on a distal end thereof configured to protrude through a locking aperture (130; shown only in FIG. 5) and out past the outer sidewall of the frame member (106).

Advantageously, the locking tab (144) functions as a visual indicator and provides quick visible feedback to an operator assembling the pipe frame (100) and/or to a driver before transporting a bundle of pipes, that the pipe frame (100) components are secured relative to each other.

In use, the locking element (140) can be disengaged from the locking aperture (130) by depressing the locking tab (144) against the bias of the resilient finger (142) out of engagement with the locking aperture (130; shown only in FIG. 5), so that the transverse leg formation (110) can then be axially removed from the receiving opening (120) to thereby detach an end of the upper or lower frame member (102, 104 (not shown)) relative to the side frame member (106).

Advantageously, the locking apertures and elements (130, 140) secure the frame members (102, 106) relative to each other to provide a sturdy pipe frame (100) yet also enable the frame members (102, 106) to be manually detached from each other quickly and easily and without additional tools.

Figure 12A:
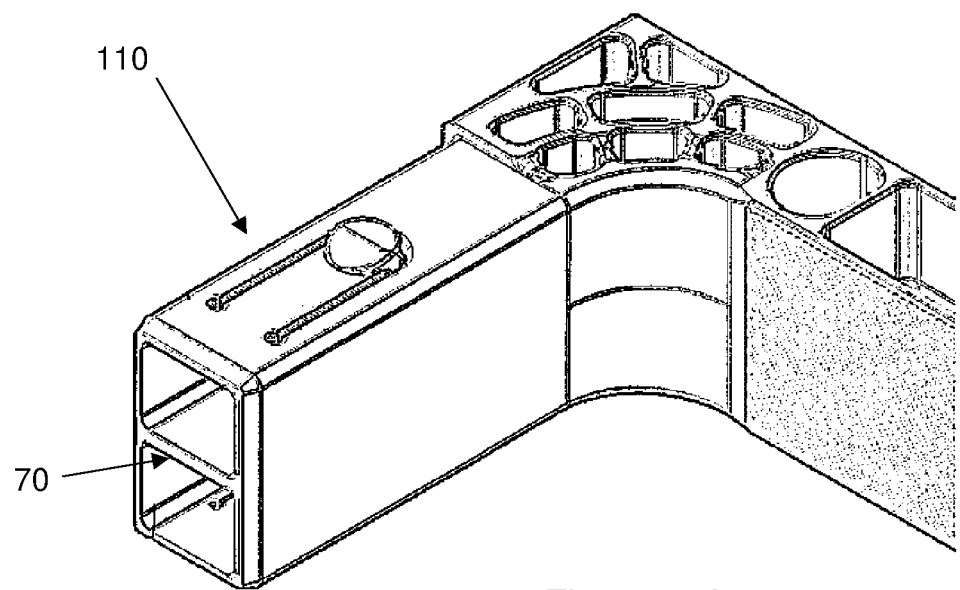
FIGS. 12A and 12B respectively show perspective views of part of a pipe frame according to differing embodiments of the present invention.
Figure 12B:
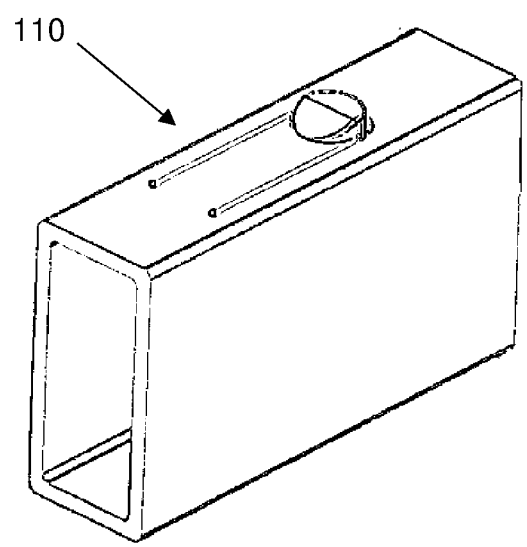

FIGS. 12A and 12B show alternative embodiments of the transverse leg formation (110).

For example, FIG. 12B corresponds to a normal transverse leg formation (110) defined by four sidewalls through an injection moulding process and defining a hollow interior.

In contrast, FIG. 12A shows a transverse leg formation (110) for use with larger pipe frames (100) in which greater strength and rigidity is required. Specifically, the transverse leg formation (110) further includes internal wall (70) extending internally between opposed sidewalls and extending longitudinally the full length of the leg formation (110). Advantageously, the internal wall (70) stiffens the leg formation (110), which is advantageous when the pipe frame (100) is larger and/or the bundle of pipe is larger or heavier.

Figure 13A:
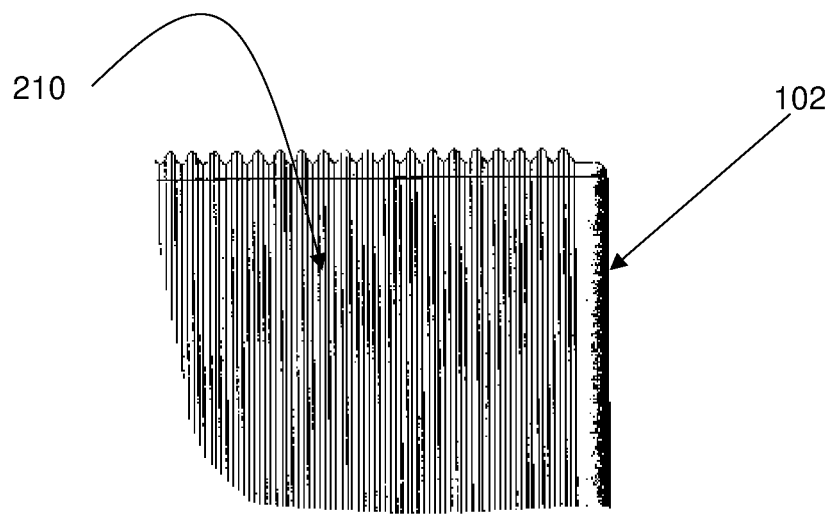
FIGS. 13A and 13B respectively show an enlarged plan view and side view of ribbing defined on an outer surface of frame members of the pipe frame as shown in FIG. 3 to increase a coefficient of friction of the surface.
Figure 13B:
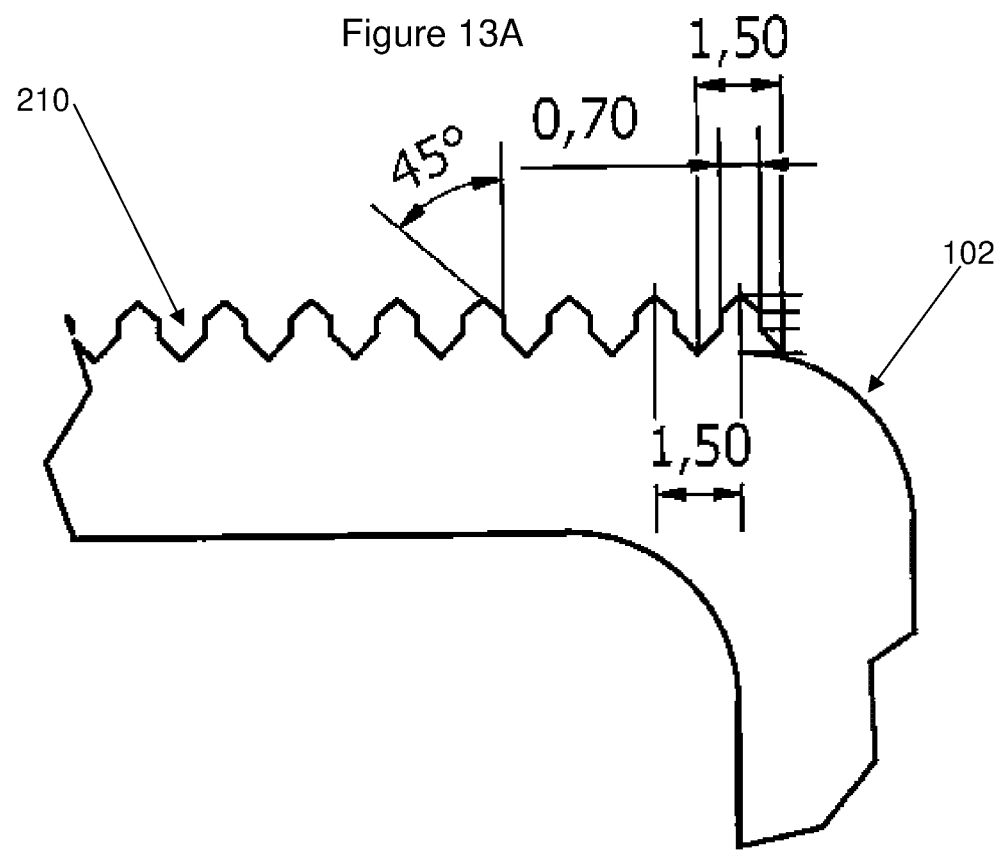
Figure 14:
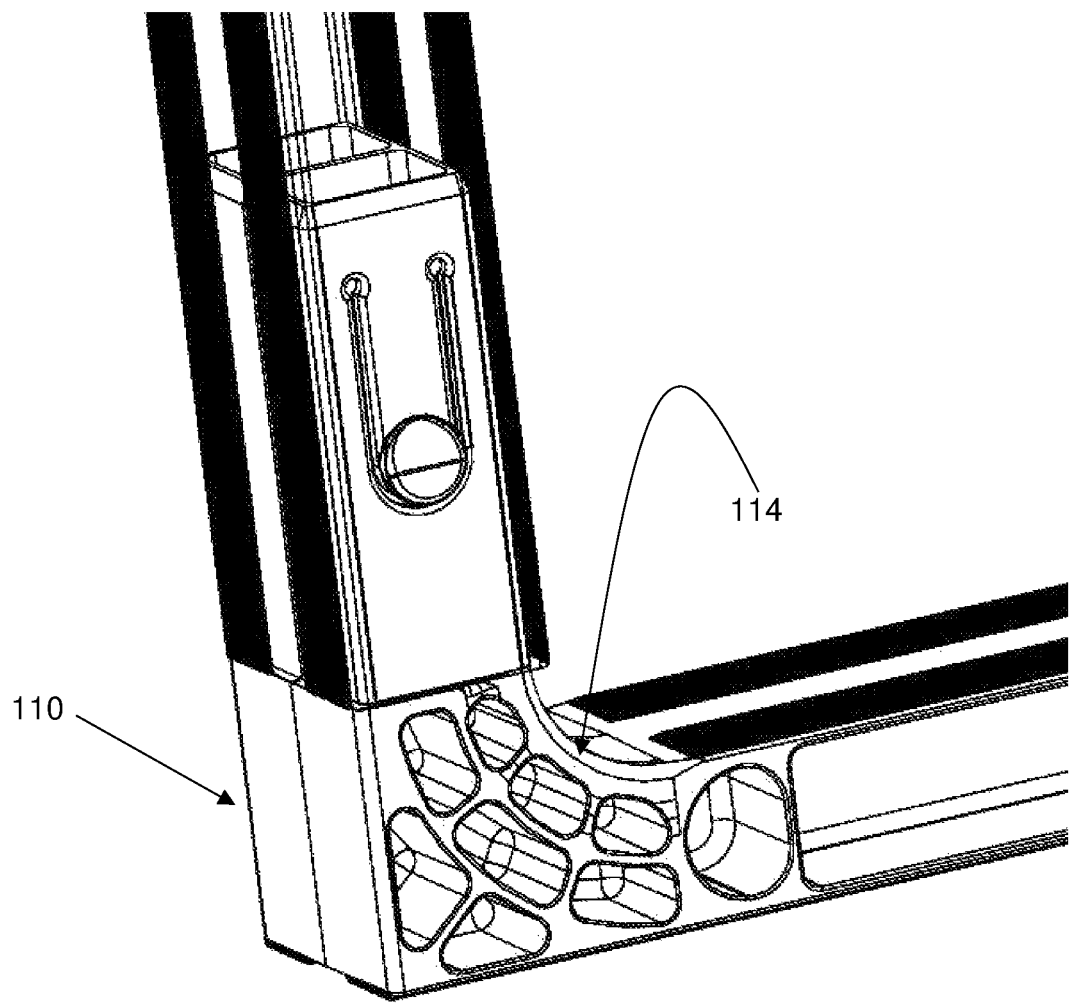
FIG. 14 is a magnified image of part of the pipe frame as shown in FIG. 1.

Referring to FIGS. 13A and 13B, in some embodiments, the surface of the outer wall of the upper and/or lower frame members (102, 104 (not shown)) is modified to increase its coefficient of friction.

Specifically, and as shown in FIG. 13A, the surface has a plurality of grooves (210) defined thereon.

Referring to FIG. 13B, the grooves (210) extend transversely relative to a length of the frame member (102, 104 (not shown)), and, consequently, the coefficient of friction is increased to at least 0.58. By way of comparison, conventional pipe frames made from wooden slats or frame members have a coefficient of friction of about 0.4.

Advantageously, by increasing the coefficient of friction via the plurality of grooves (210) defined on the surface of the outer wall of the upper and lower frame members (102, 104 (not shown)), the grip of the pipe frame (100) on a trailer load deck and/or with other like pipe frames arranged in a stacked arrangement is increased thereby providing a stabler load during transport.

Referring to FIG. 13, each transverse leg formation (110) includes a plurality of fillet and curve elements (114) defined in opposed side walls to maintain a high strength to weight ratio and reduce peak load stress.

A method of assembling and loading three pipe frames (100) to form a pipe crate (1,000) for bundling together a group of pipes (900) will now be described with reference to FIGS. 6-10.

Figure 6:
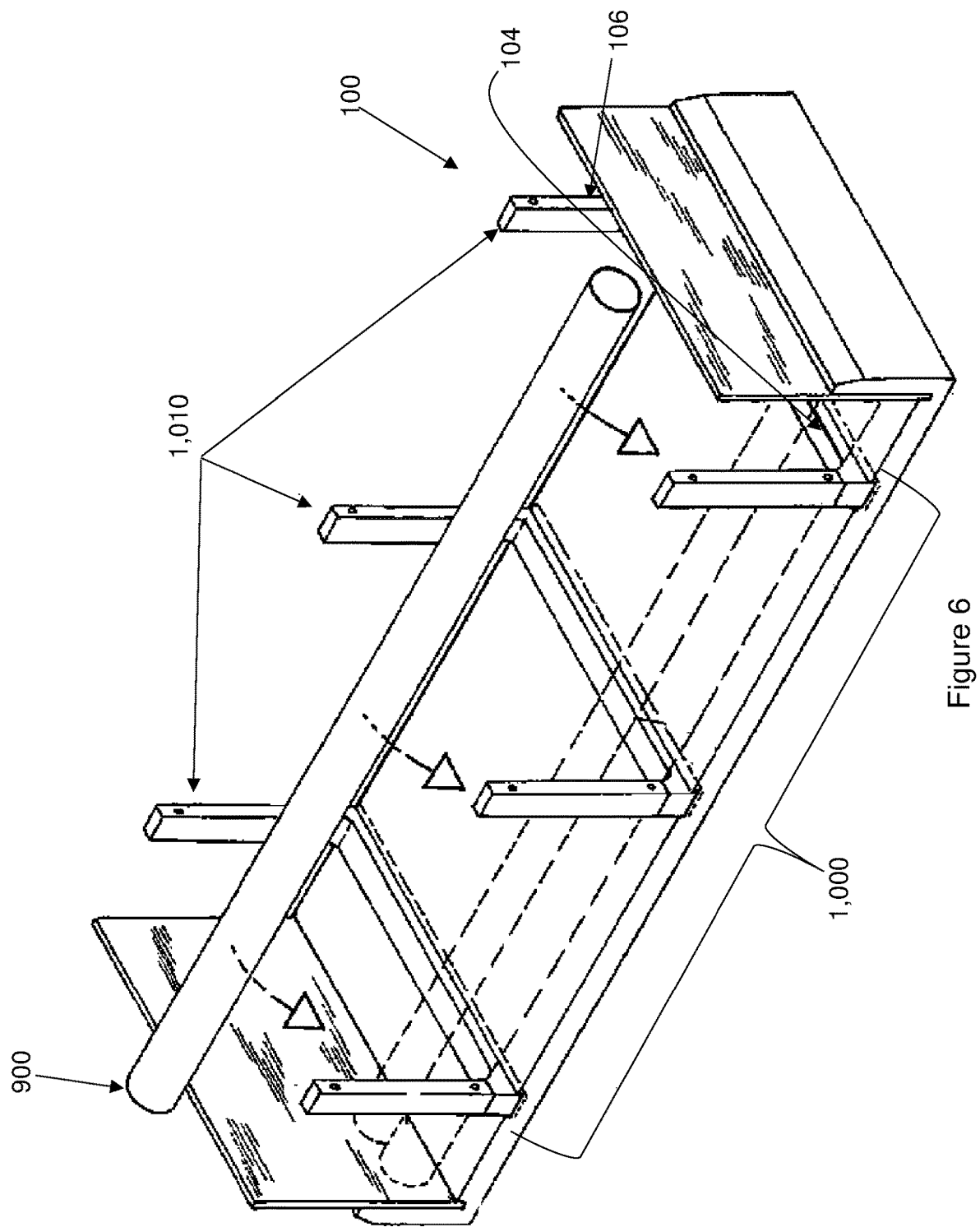
FIG. 6 is an upper perspective view of a partially assembled pipe crate according to an embodiment of the present invention for receiving pipes.

Referring to FIG. 6, two opposed side frame members (106) are attached to each lower frame member (104) resting on a support surface. As shown, there are three such assemblies laid out on the support surface and arranged in a longitudinal arrangement with each other and spaced apart from each other. The assemblies collectively form an upwardly facing cradle (1,010) suitable for receiving pipes (900) therein.

Figure 7:
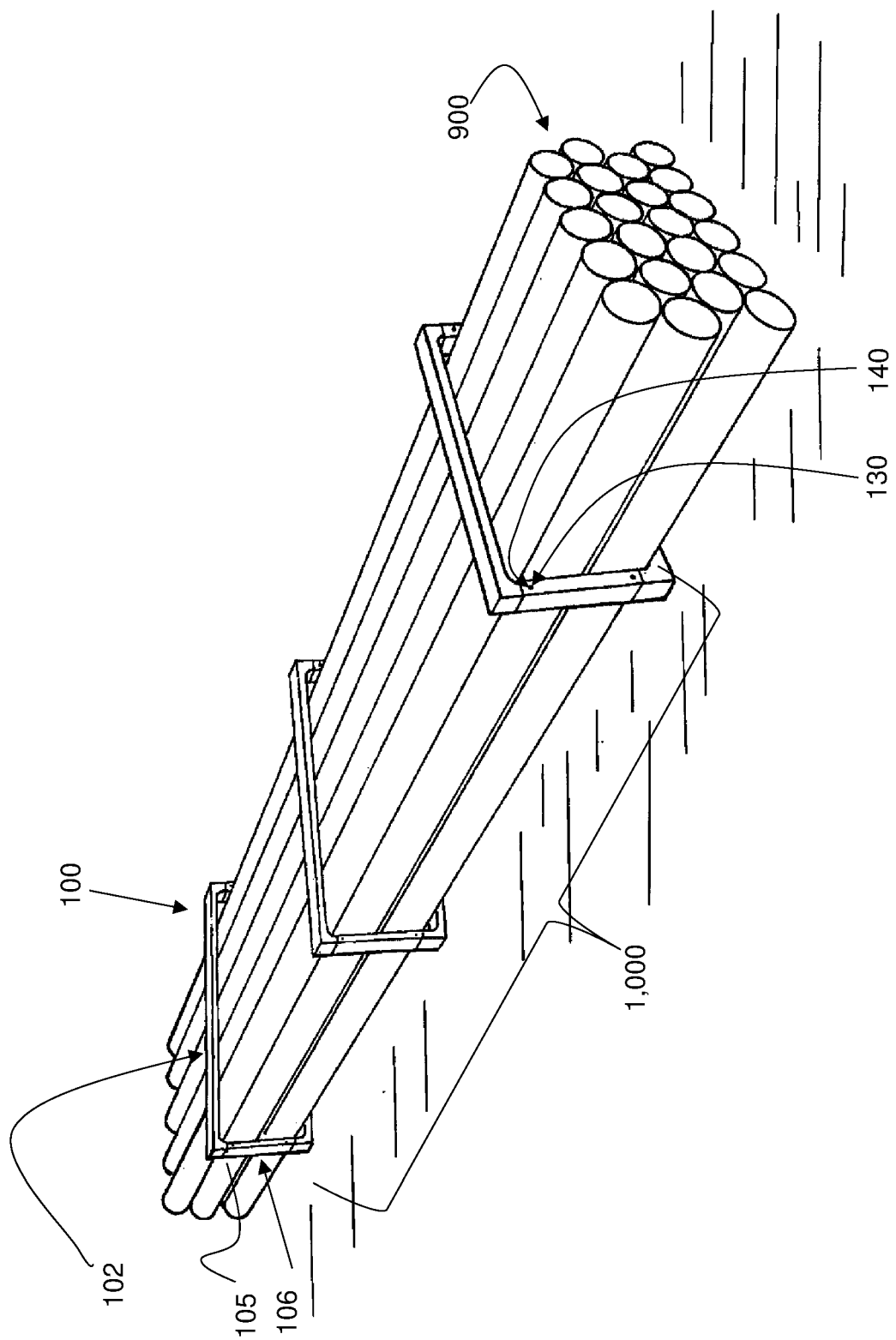
FIG. 7 is an upper perspective of a fully assembled pipe crate according to an embodiment of the present invention.
Figure 8:
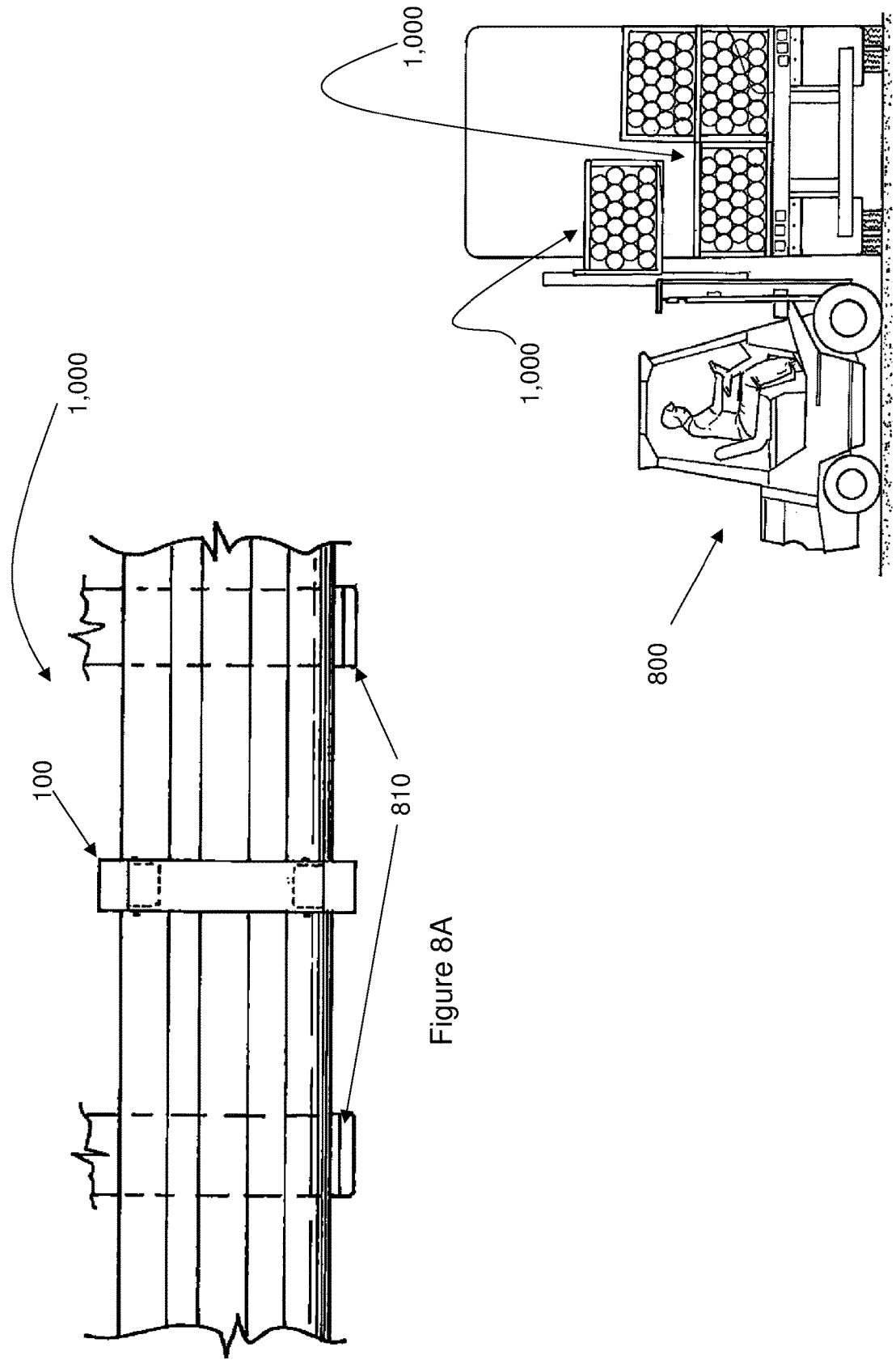
FIGS. 8A and 8B respectively show a schematic plan view of a pipe crate as shown in FIG. 7 being lifted by the tines of a forklift truck and being loaded by the forklift truck onto a trailer of a truck together with other like pipe crates.

Thereafter, the pipes (900) can be loaded into the cradle (1,010) until a bundle of pipes (900) is collected as shown in FIG. 7.

Referring to FIG. 7, once the cradle has been filled with pipes (900), the upper frame member (102) of each pipe frame (100) is attached to the open ends (105) of the respective side frame members (106) to complete assembly of the pipe frame (100) and collectively complete assembly of the pipe crate (1,000).

Advantageously, the clicking of the locking elements (140) into the respective locking apertures (130) of each side frame member (106) provides both audible and visual feedback to an operator that the upper frame members (102) of each pipe frame (100) are secured, or locked, relative to a remainder of the pipe frame (100).

Referring to FIG. 8B, when the pipe crate (1,000) needs to be transported to another location, a forklift truck (800) can be used to lift each pipe crate (1,000) and load it onto a trailer of a transport truck, or atop other like pipe crates (1,000) loaded into the trailer in a stacked arrangement.

Referring to FIG. 8A, advantageously, the lower frame member (104; not visible) of each pipe frame (100) of the pipe crate (1,000) spaces the pipe crate (1,000) sufficiently above a support surface such that the tines (810) of a forklift truck (800; not shown) can fit therebetween for lifting the pipe crate (1,000). The space equates to about 40 mm being the thickness of the lower frame member (104).

Figure 9:
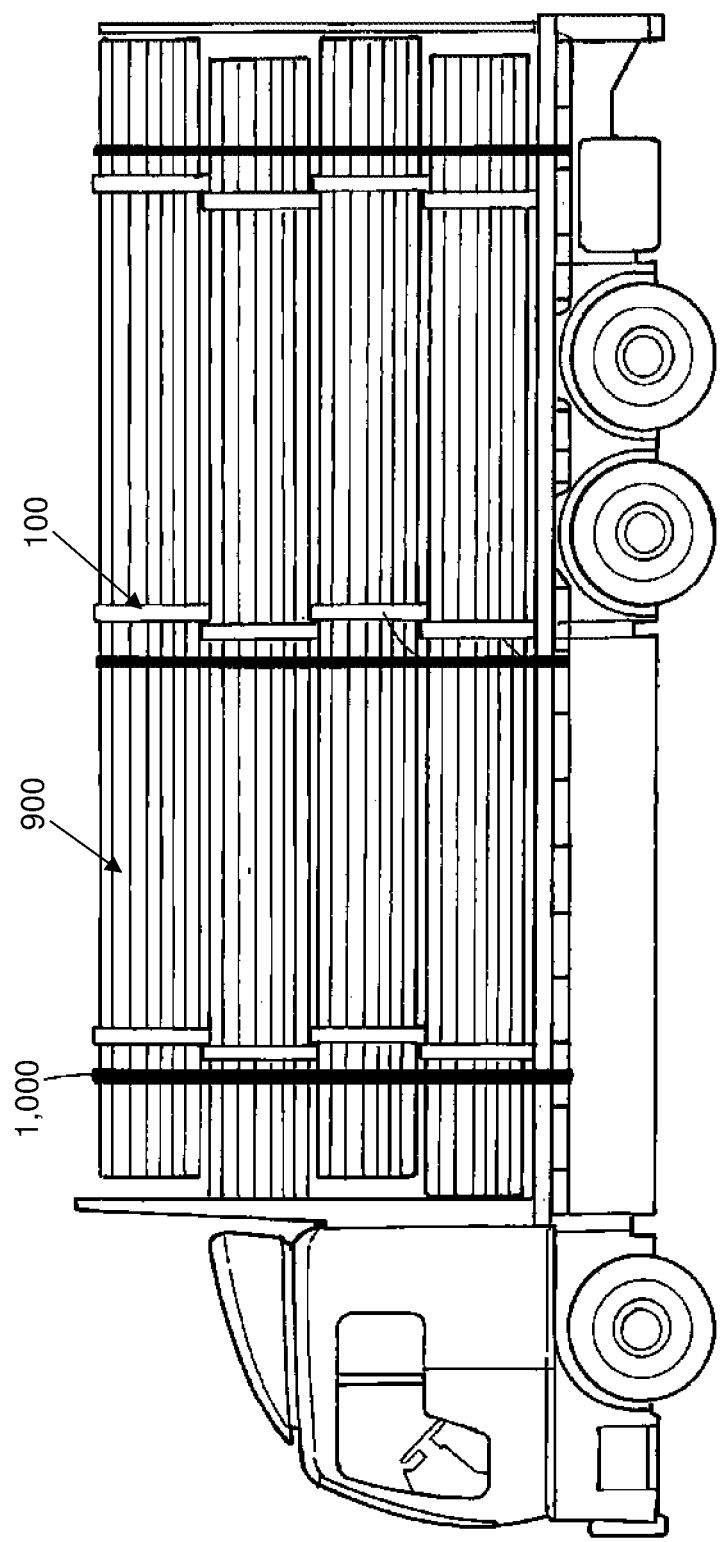
FIG. 9 is a side view of a trailer of a truck showing stacks of pipe crates as shown in FIG. 7 secured to the trailer by load restraining straps.
Figure 10:
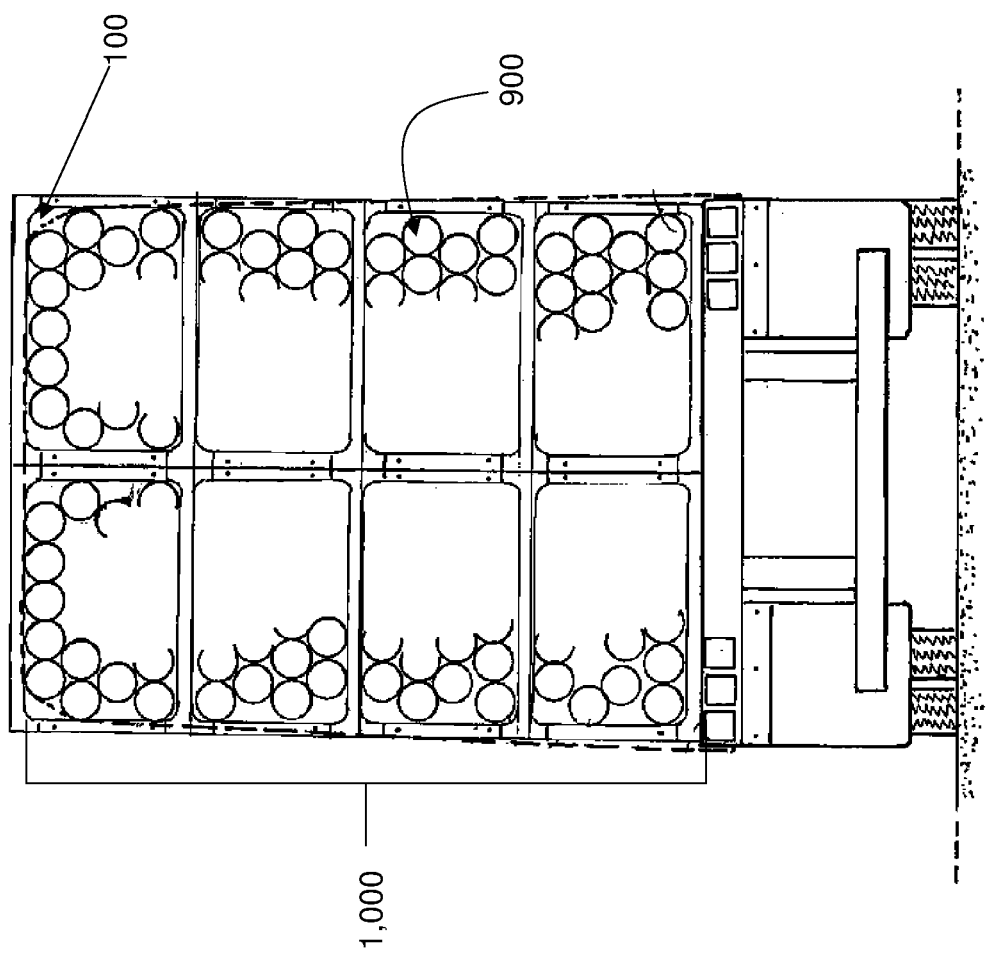
FIG. 10 is a rear view of the trailer loaded with stacked pipe crates as shown in FIG. 9.

Referring to FIGS. 9 and 10, once the pipe crates (1,000) are loaded into the trailer, the pipe crates (1,000) are secured in place by loading straps.

There is obviously an economic imperative to pack as many pipes (900) on a truck when transporting the pipe crates (1,000) to a distribution point or supply point, to keep the transport cost as low as possible.

During transport of the pipe crates (1,000) from one point to another, the pipe crates (1,000) are subjected to different stresses and forces. For example, on a bumpy road, the crates (1,000) and pipes (900) will move up and down and this will apply a significant load to each pipe frame (100). However, the pipe frames (100) of the present invention have been engineered to withstand such loads normally encountered during transport and should not fail. Further, the attachment and securing of the upper and lower frame members (102, 104; not clearly shown), to the side members (106; nor clearly shown) by means of the disclosed locking arrangements is also strong and secure and will resist detachment or separation during road transport.

Once the pipe crate (1,000) reaches its destination, a forklift truck (800; not shown) can again be used to lift each pipe crate (1,000) off the trailer lower it down on a support surface in the reverse sequence as disclosed for loading.

Once the pipe crate (1,000) has been placed on a support surface, at some point it may be desirable to remove one or more of the pipe frames (100) from the pipe crate (1,000) to make the pipe frames (100) available for re-use.

Figure 11:
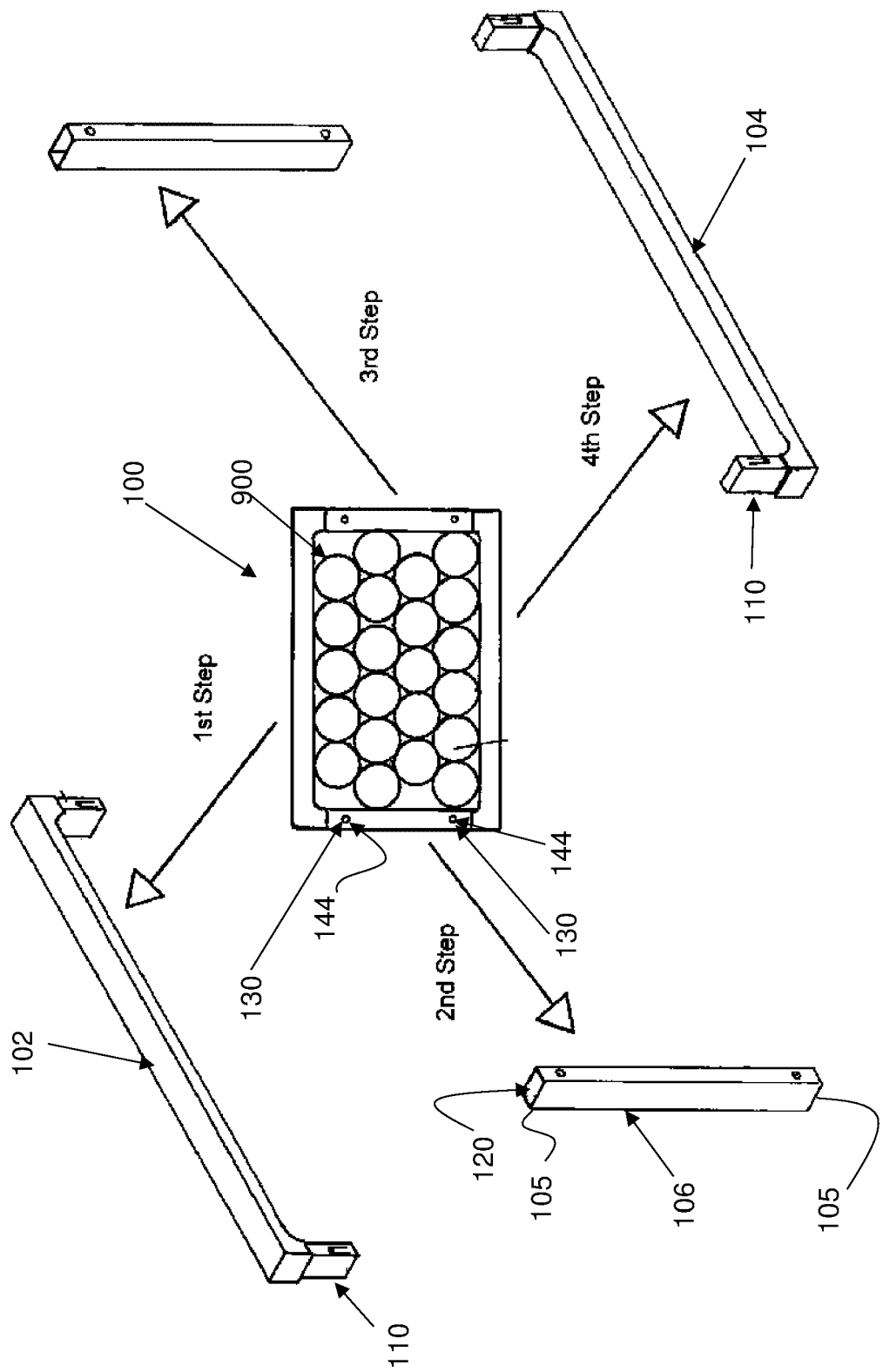
FIG. 11 is a schematic drawing show how a pipe frame as shown in FIG. 1 is disassembled in a sequence of steps.

With the above in mind, a method of disassembling a pipe frame (100) is described with reference to FIG. 11.

First, the upper frame (102) is detached from the side frame members (106) by depressing the locking tab (144) protruding through the locking aperture (130) at or near the upper end (105) of each side frame member (106). While manually depressing each locking (144), the transverse leg formation (110) is axially removed from the receiving opening (120). This process is repeated for each end (105) of the upper frame member (102).

Once the upper frame member (102) is removed, the open pipe frame (100) can be emptied of pipes (900).

Once emptied, the opposed side frame members (106) can each be detached from the lower frame member (104) again by depressing the locking tab (144) protruding through the locking aperture (130) at or near the lower end (105) of each side frame member (106) and axially separating each side frame member (106) from the transverse leg formations (110) of the lower frame member (104).

The separated frame members (102, 104, 106) can then be collected and recycled back into a pool for re-use in bunding another plurality of pipes (900).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A pipe frame for holding a plurality of pipes together, said pipe frame including:
   an upper frame member and an opposed lower frame member each extending in a generally horizontal orientation;
   and a pair of opposed side frame members extending between the upper frame member and the lower frame member to form the pipe frame, each frame member including a pair of opposed ends;
   wherein
   at least one transverse leg formation operatively associated with each end of the upper frame member and the lower frame member;
   at least one receiving opening defined at each end of the opposed side frame members, each said at least one receiving opening configured to at least partially receive a respective said at least one transverse leg formation for attachment and orientation of the upper and lower frame members relative to the side frame members;
   a locking catch operatively associated with the receiving opening; and
   a locking element operatively associated with the transverse leg formation and releasably connectable to the locking catch when the transverse leg formation is received in the receiving opening for securing, or locking, the upper and lower frame members relative to the opposed side frame members.

2. The pipe frame of claim 1, wherein the locking catch includes a locking aperture defined in a sidewall of the side frame members at or near the receiving opening and the locking element is biased to displace outwardly into the locking aperture when the at least one transverse leg formation is inserted into the at least one receiving opening.

3. The pipe frame of claim 2, wherein the locking element further includes a resilient finger integrally formed with the at least one transverse leg formation and configured to be biased away from the at least one transverse leg formation.

4. The pipe frame of claim 3, wherein the resilient finger further includes a locking tab on a distal end thereof configured to protrude through the locking aperture and provide a visual indicator when the first frame member is secured relative to the second frame member.

5. The pipe frame of claim 4, wherein the locking tab is coloured a bright colour to provide the visual indicator and provide visual feedback to an operator assembling the pipe frame that the first frame member is secured relative to the second frame member.

6. The pipe frame of claim 1, wherein the at least one transverse leg formation includes a leg formation projecting transversely away from each of the upper frame member and the lower frame member end of the first frame member in an orthogonal orientation relative to a longitudinal axis of each of the upper frame member and the lower frame member.

7. The pipe frame of claim 1, wherein the at least one transverse leg formation is provided at each end of the first frame member and oriented in a same direction.

8. The pipe frame of claim 1, wherein the at least one transverse leg formation further includes an internal wall extending between opposed side walls and extending longitudinally a full length of the leg formation, said internal wall configured to strengthen the at least one transverse leg formation and resist outward flex as the pipe frame is loaded with a bundle of pipes.

9. The pipe frame of claim 1, wherein the at least one transverse leg formation further includes one or more fillets and curves on opposed sidewalls of the leg formation.

10. The pipe frame of claim 1, wherein the locking element is configured to engage with the locking catch when the at least one transverse leg formation is inserted into the at least one receiving opening to automatically secure the first frame member relative to the second frame member.

11. The pipe frame of claim 1, wherein the locking element is manually disengaged from the locking catch by depressing the locking element against its bias out of engagement with the locking catch.

12. The pipe frame of claim 1, wherein the first frame member includes an upper frame member and an opposed lower frame member and the second frame member includes a pair of opposed side frame members extending between the opposed ends of the upper frame member and the lower frame member to form the pipe frame.

13. The pipe frame of claim 12, wherein at least one of the upper and lower frame members includes a plurality of grooves defined on an outer surface of an outer wall to increase its coefficient of friction and provide grip when loaded on a support surface.

14. The pipe frame of claim 13, wherein at least one of the upper and lower frame members may include a plurality of grooves defined on an inner surface of an inner wall, each groove may be configured to receive at least part of a pipe therein.

15. A pipe crate including:
 a group of closely packed pipes; and
 at least two pipe frames according to claim 1 extending circumferentially around the group of closely packed pipes to hold the pipes together, said pipe frames being spaced from each other along a length of the pipes so to form a single entity together with the pipes.

16. The pipe crate of claim 15, wherein the at least two pipe frames are located at or near opposed ends of the group of closely packed pipes.

17. The pipe crate of claim 16, further including a third pipe frame located at an intermediate position relative to the at least two pipe frames.

18. A method of bundling a plurality of pipes together, said method including:
 providing the pipe frame of claim 12;
 placing the lower frame member atop a support surface;
 attaching side frame members to each end of the lower frame member to form an upwardly facing cradle;
 loading pipes into the cradle; and
 releasably securing an upper frame member relative to each side frame member so as to form a pipe frame extending circumferentially around the pipes.

\* \* \* \* \*